(12) United States Patent
Kim

(10) Patent No.: US 7,258,447 B2
(45) Date of Patent: Aug. 21, 2007

(54) IMAGE PROJECTION APPARATUS

(75) Inventor: Sang-ik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 10/983,614

(22) Filed: Nov. 9, 2004

(65) Prior Publication Data

US 2005/0254014 A1 Nov. 17, 2005

(30) Foreign Application Priority Data

May 12, 2004 (KR) ...................... 10-2004-0033325

(51) Int. Cl.
*G03B 21/26* (2006.01)
*G03B 21/28* (2006.01)

(52) U.S. Cl. .............................. 353/61; 353/57; 353/60

(58) Field of Classification Search .................. 353/57, 353/52, 58, 60, 61, 71, 72, 74, 79, 119, 122; 348/748; 349/161; 362/264, 294, 345, 373
See application file for complete search history.

(56) References Cited

U.S. PATENT DOCUMENTS 5,722,753 A 3/1998 Okada
5,951,136 A * 9/1999 Furuhata et al. ............... 353/31
6,484,854 B2 11/2002 Yoshimoto
6,558,004 B2 * 5/2003 Ito et al. ........................ 353/57
6,814,446 B2 * 11/2004 Yamada et al. ............... 353/60

FOREIGN PATENT DOCUMENTS

JP 05-005947 1/1993
KR 20-0151071 4/1999

\* cited by examiner

*Primary Examiner*—W. B. Perkey
*Assistant Examiner*—Rochelle Blackman
(74) *Attorney, Agent, or Firm*—Stanzione & Kim, LLP

(57) ABSTRACT

An image projecting apparatus including a base, a ballast unit disposed on a top of the base, a display device disposed adjacent to the ballast unit, a cooling fan disposed on the base and introducing external air to the ballast unit, and a guide duct in communication with the ballast unit, guiding the external air blown by the cooling fan to the display device. Thus cooling down of heat generating units such as a lamp unit, a ballast unit, a colorwheel unit, etc., with a minimized number of fans is provided while reducing noise generated therefrom and increasing cooling efficiency.

18 Claims, 8 Drawing Sheets

IMAGE PROJECTION APPARATUS

CROSS-REFERENCE TO RELATED APPLICATIONS

This application claims the benefit of Korean Patent Application No. 2004-33325, filed on May 12, 2004, in the Korean Intellectual Property Office, the disclosure of which is incorporated herein in its entirety and by reference.

BACKGROUND OF THE INVENTION

1. Field of the Invention

The present general inventive concept relates to an image projecting apparatus, and more particularly, to an image projecting apparatus improving a cooling efficiency.

2. Description of the Related Art

Generally, an image projecting apparatus is an audio-visual apparatus used for a presentation or multimedia education, by projecting an image beams onto a screen connected to a computer, etc.

The image projecting apparatus can be classified into an LCD (Liquid Crystal Display) type and a DLP (Digital Light Processing) type, etc., according to a display device displaying signal image information.

A conventional image projecting apparatus comprises a plurality of heat generating units which necessarily generate heat in operation. The heat generated by the plurality of heat generating units is cooled compulsively using a separate cooling system.

The image projecting apparatus has a limitation in cooling every heat generating unit using only one cooling fan due to the arrangement problem of these heat generating units. Accordingly, the image projecting apparatus supplies and distributes external air to each of these heat generating units, which need to be cooled by using a plurality of cooling fans or guide means, such as a duct, etc. The image projecting apparatus with the structure described above is disclosed in Korean Patent Application No. 2000-0050749 and Japanese Patent First Publication No. 2001-051349.

However, in the case that these heat generating units are cooled by a plurality of cooling fans, noise due to these cooling fans increases while cooling efficiency of the cooling system is decreased relatively.

Further, when these heat generating units are cooled by the guide means, such as a duct, etc., a structure of the cooling system is relatively complicated and the volume of the image projecting apparatus is large. As a result, manufacturing costs increase due to these factors.

SUMMARY OF THE INVENTION

Accordingly, it is an aspect of the present general inventive concept to provide an image projecting apparatus cooling down heat generating units such as a lamp unit, a ballast unit, a colorwheel unit, etc., with a minimized number of fans, thereby reducing noise generated therefrom.

In addition, the present general inventive concept can directly cool the ballast and a display device by blowing external air, thereby increasing cooling efficiency.

Additional aspects and/or advantages of the present general inventive concept will be set forth in part in the description which follows and, in part, will be obvious from the description, or may be learned by practice of the general inventive concept.

The foregoing and/or other aspects and advantages of the present general inventive concept are achieved by providing an image projecting apparatus comprising: a base; a ballast unit disposed on a top of the base; a display device disposed adjacent to the ballast unit; a cooling fan disposed on the base and introducing external air to the ballast unit; and a guide duct in communication with the ballast unit, guiding the external air blown by the cooling fan to the display device.

According to an aspect of the general inventive concept, the ballast unit may comprise a ballast housing which the external air blown from the cooling fan is introduced into, and formed with an exhaust part and a communication part in communication with the guide duct; a branch rib inside of the ballast housing branching the external air toward the exhaust part and the communication part; and a ballast disposed on flow-paths of the external air of the ballast housing toward the exhaust part.

According to an aspect of the general inventive concept, the base may comprise a blowhole, the cooling fan is disposed on a bottom of the base to communicate with the blowhole, and the ballast unit is on flow-paths of the external air blown through the blowhole of the base.

According to an aspect of the present general inventive concept, the base comprises a blowhole, the cooling fan is disposed on a bottom of the base to communicate with the blowhole, and the ballast unit is on these flow-paths of the external air blown through the blowhole of the base.

According to an aspect of the present general inventive concept, the ballast unit stands up and a bottom of the ballast unit is opened so that the external air blown by the cooling fan is introduced therein.

According to an aspect of the present general inventive concept, the ballast unit stands up and a bottom of the ballast unit is opened so that the external air blown by the cooling fan is directly introduced therein.

According to an aspect of the present general inventive concept, the display device comprises a DMD panel.

The foregoing and/or other aspects and advantages of the present general inventive concept are also achieved by providing an image projecting apparatus comprising: a base formed with a blowhole; a cooling fan disposed on a bottom of the base to communicate with the blowhole; and a ballast unit standing up to communicate with a top of the base, and opened at a bottom thereof to directly introduce therein the external air blown by the cooling fan.

BRIEF DESCRIPTION OF THE DRAWINGS

These and other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
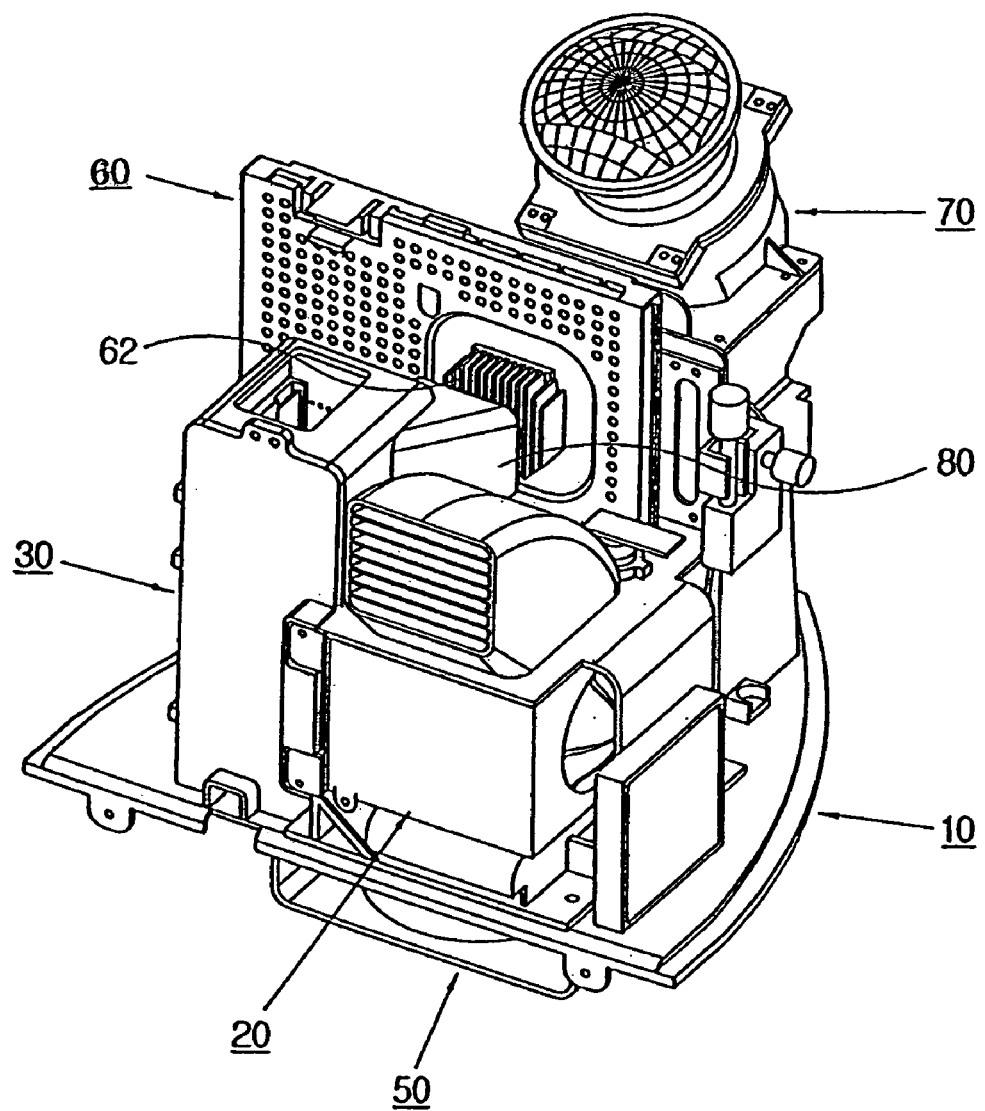
FIG. 1 is a perspective view of an image projecting apparatus according to an embodiment of the present general inventive concept.
Figure 2:
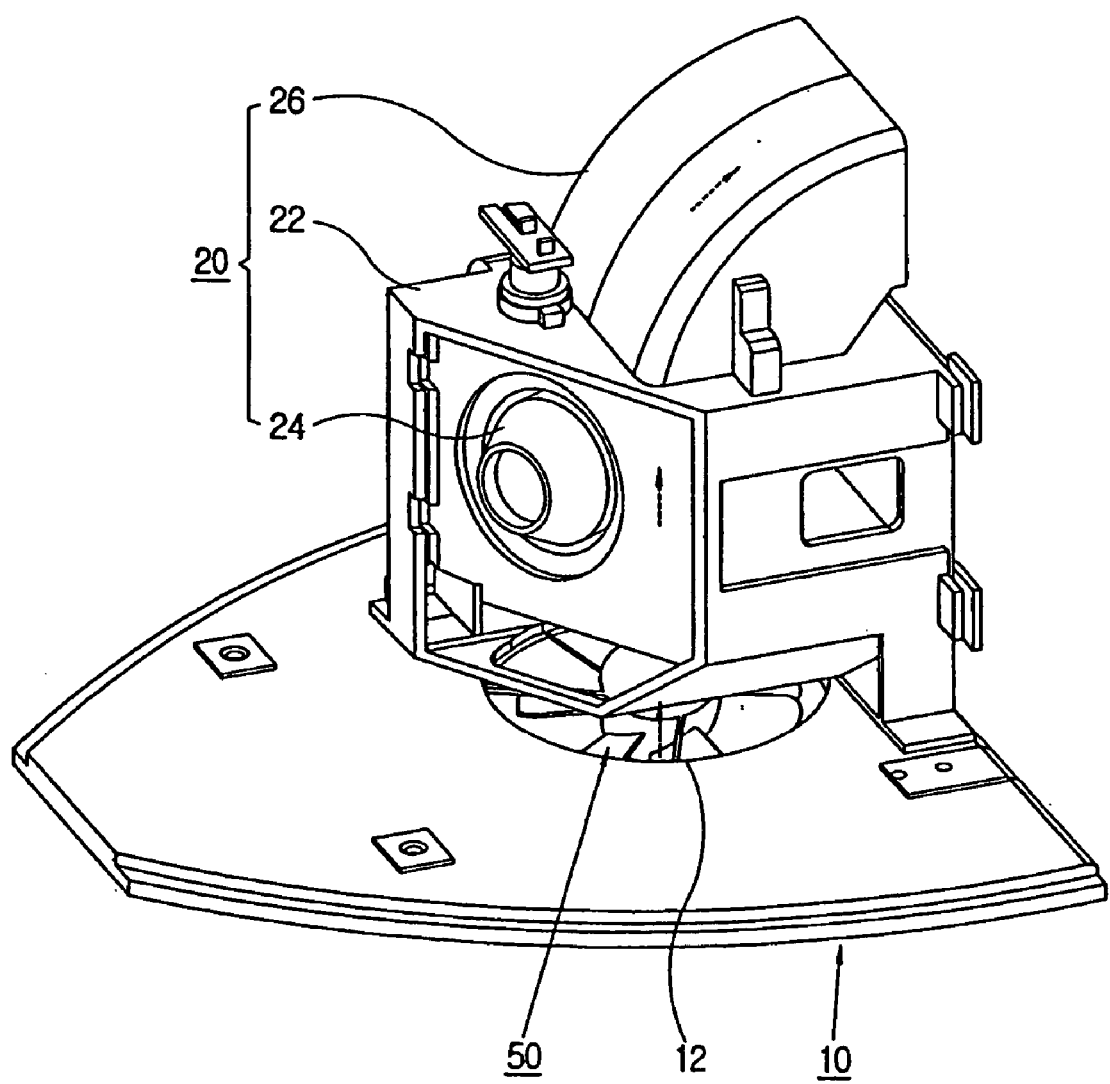
FIG. 2 is a perspective view illustrating a configuration of a lamp unit of an image projecting apparatus, according to an embodiment of the present general inventive concept.
Figure 3:
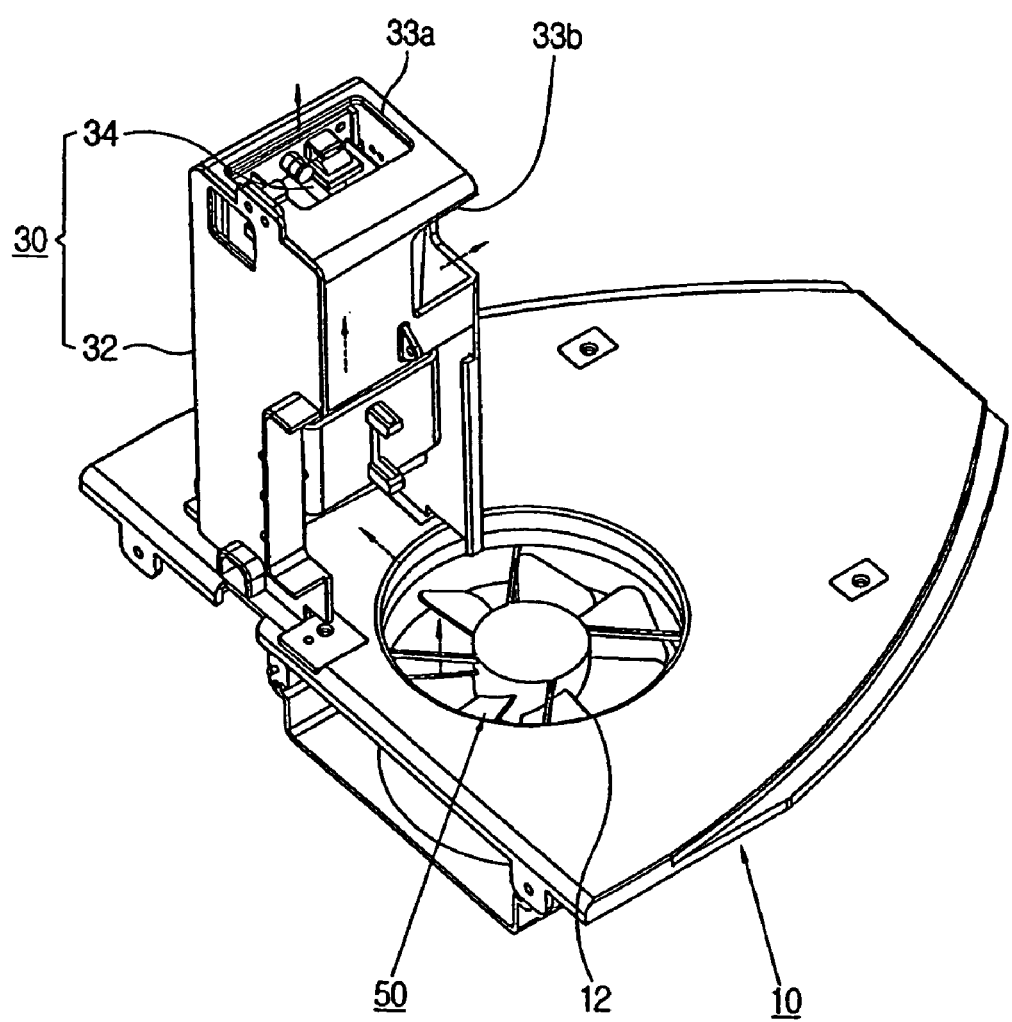
FIG. 3 is a perspective view illustrating a configuration of a ballast unit of an image projecting apparatus, according to the present general inventive concept.
Figure 4:
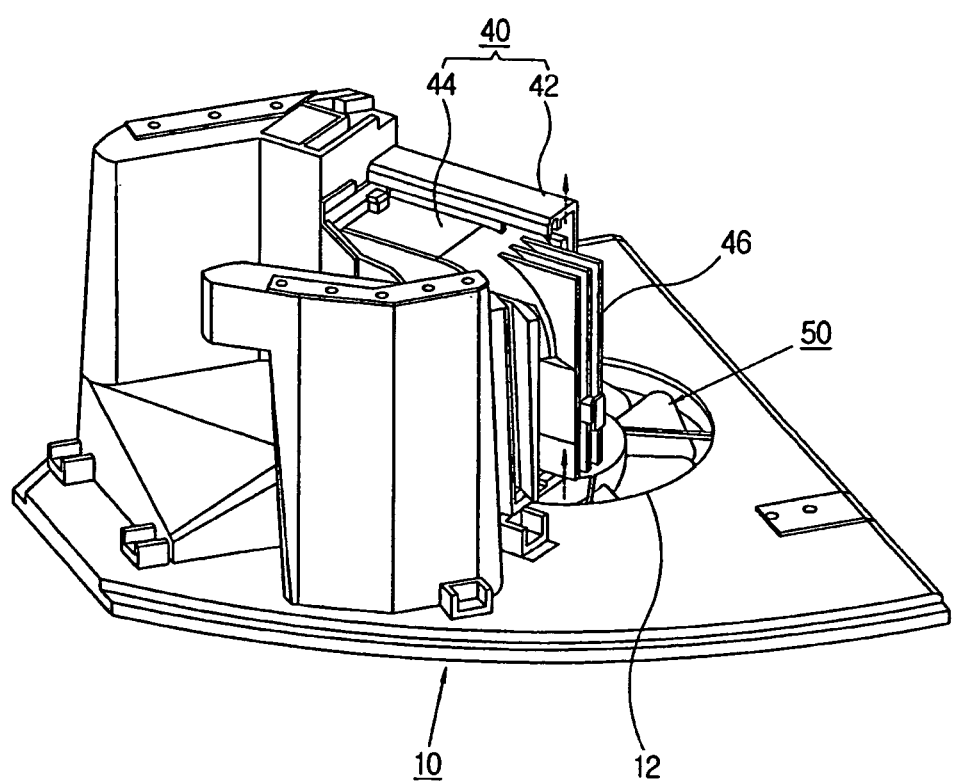
FIG. 4 is a perspective view illustrating a configuration of a colorwheel unit of an image projecting apparatus, according to the present general inventive concept.

Reference will now be made in detail to the embodiments of the present general inventive concept, examples of which are illustrated in the accompanying drawings, wherein like reference numerals refer to like elements throughout. The embodiments are described below to explain the present general inventive concept by referring to the figures.

As shown in FIGS. 1 through 4, an image projecting apparatus according to an embodiment of the present general inventive concept may comprise a base 10; a plurality of heat generating units 20, 30 and 40 set on a top of the base 10 and generating heat in operation; a cooling fan 50 set on a bottom of the base 10 and cooling a plurality of heat generating units 20, 30 and 40 at the same time by blowing external air upward through the base 10.

The base 10 stably supports types of units including the plurality of heat generating units 20, 30 and 40, and has at a side thereof a blowhole 12 to blow the external air upward by the cooling fan 50. The form of base 10 can be variously changeable according to the form and the arrangement of the image projecting apparatus. Also, the size of the blowhole 12 is as large as the size required to communicate with each of the heat generating units 20, 30 and 40.

The plurality of heat generating units 20, 30 and 40 may comprise a lamp unit 20, a ballast unit 30 and a colorwheel unit 40 which are disposed adjacent to each other on the top of the base 10. It is an aspect of the present general inventive concept that the bottom of the lamp unit 20, the ballast unit 30 and the colorwheel unit 40 are opened so that the external air blown upward through the blowhole 12 of the base 10 is introduced therein. Alternatively, closed bottoms of each of the heat generating units 20, 30 and 40 can be provided.

The plurality of heat generating units 20, 30 and 40 may comprise other kinds of units that necessarily need cooling while operating in the image projecting apparatus as well as the lamp unit 20, the ballast unit 30 and the colorwheel unit 40.

The lamp unit 20 projects white light of high brightness and can use an arc lamp, a laser, etc. The lamp unit provides a cut filter (not shown) and others, passing therethrough only visible rays and blocking off unnecessary light to display an image. The lamp unit 20 may comprise a lamp housing 22 in which the external air blown from the cooling fan 50 is introduced by being in communication with the blowhole 12 of the base 10; a lamp 24 provided inside of the lamp housing 22; and an exhaust duct 26 in communication with the top of the lamp housing 22.

The lamp housing 22 has a structure to easily and efficiently cool heat generated from the lamp 24. According to the lamp housing structure, the external air blown upward is directly introduced into the lamp housing 22 since a bottom of the lamp housing 22 is opened to communicate with the blowhole 12 of the base 10. The lamp housing 22 covers the lamp 24 and at the same time guides heat-exchanged external air that passes the lamp 24 and flows through the exhaust duct 26.

The exhaust duct 26 emits the external air introduced into the lamp housing 22 and passing the lamp 24.

The ballast unit 30 makes the operation of the lamp unit 20 stable and can stand up on the base 10 so as to improve cooling efficiency. The ballast unit 30 may comprise a ballast housing 32 in which the external air blown from the cooling fan 50 is introduced by being in communication with the blowhole 12 of the base 10 and a ballast 34 inside of the ballast housing 32.

The ballast housing has a structure to efficiently cool heat generated from the ballast 34. According to the structure, the external air blown upward by the cooling fan is directly introduced into the ballast housing 32 because a bottom of the ballast housing 32 is opened to communicate with the blowhole 12 of the base 10.

Moreover, the ballast housing 32 has an exhaust part 33a on a top of the ballast housing 32 to emit heat-exchanged external air through the ballast 34 and has a communication part 33b on a side of the ballast housing 32 guiding the external air introduced into the ballast housing 32 to a guide duct 80.

The guide duct 80 is positioned to correspond to a heat sink 62 on a display device 60 to cool the display device 60 by using the external air introduced into the ballast housing 32.

The colorwheel unit 40 may comprise a colorwheel housing 42 in contact with the external air blown from the cooling fan 50 by being in communication with the blowhole 12 of the base 10; and a colorwheel 44 inside of the colorwheel housing 42, and dividing incident light to RGB beams.

The colorwheel housing 42 is on a top portion of the blowhole 12 and is sealed up to prevent external materials from coming into the colorwheel 44. The colorwheel housing 42 is made of material that is able to cool heat generated from the colorwheel 44 by being in contact with the external air blown from the cooling fan 50.

The cooling fan 50 is on a bottom of the base 10, and the lamp unit 20, the ballast unit 30 and the colorwheel unit 40 are arranged on flow-paths of the external air blown upward by the cooling fan 50. In other words, the lamp unit 20, the ballast unit 30 and the colorwheel unit 40 all share the external air blown by the cooling fan 50 since the lamp unit 20, the ballast unit 30 and the colorwheel unit 40 each communicate with the blowhole 12.

Accordingly, only one cooling fan 50 is required to cool the lamp unit 20, the ballast unit 30 and the colorwheel unit 40 simultaneously, thereby improving cooling efficiency while reducing cost and noise.

The cooling fan 50 can have a relatively high capacity to improve cooling efficiency, and can use a blower type fan that is superior in efficiency to a suction type fan, thereby reducing an operating voltage and a number of rotations. Alternative types of cooling units may be used which provide the intended purpose of the cooling fan 50 described above.

The display device 60 modulates and reflects the RGB beams projected through the colorwheel unit 40 and usually uses a DMD panel. The DMD panel comprises a plurality of micromirrors, and the RGB beams are projected to the DMD panel and reflected at the micromirrors. The RGB beams reflected at the display device 60 are projected to a screen through the lens unit 70 to display a picture.

A heat sink 62 is placed at the display device 60, and a heat sink 62 is positioned to correspond to the guide duct 80.

The reference number 46 illustrates a cooling fin connected to the colorwheel 44.

The cooling system of the image projecting apparatus descrived above is operated as follows.

At first, the external air blown by the cooling fan 50 is distributed and supplied respectively to the lamp unit 20, the ballast unit 30 and the colorwheel unit 40 through the blowhole 12 of the base 10.

After the external air supplied to the lamp unit 20 performs a cooling operation, the external air is discharged through the exhaust duct 26. Some of the external air introduced into the ballast unit 30 performs a cooling operation, and then is discharged through the exhaust part 33a, and the rest of the external air cools the display device 60 by being guided to the guide duct 80 through the communication part 33b.

The external air introduced to the colorwheel unit 40 performs a cooling operation by making contact with the color wheel unit 40.

Figure 5:
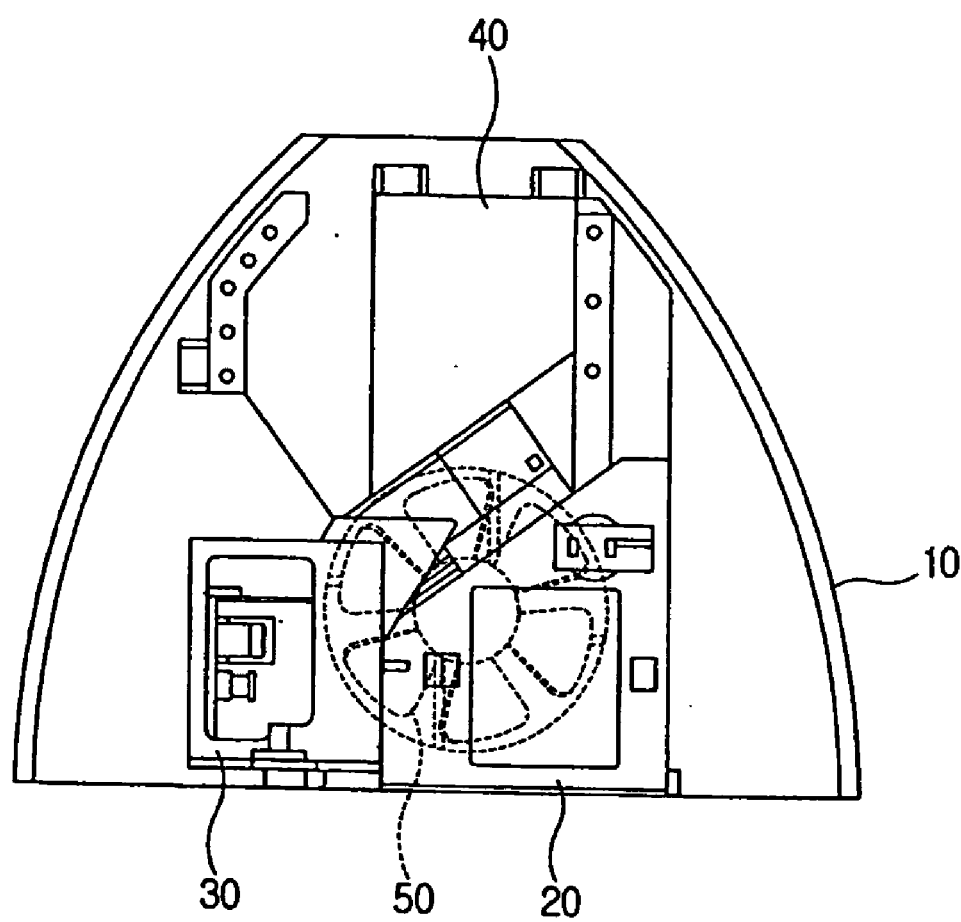
FIG. 5 is a plane view illustrating a cooling structure of an image projecting apparatus, according to an embodiment of the present general inventive concept.
Figure 6:
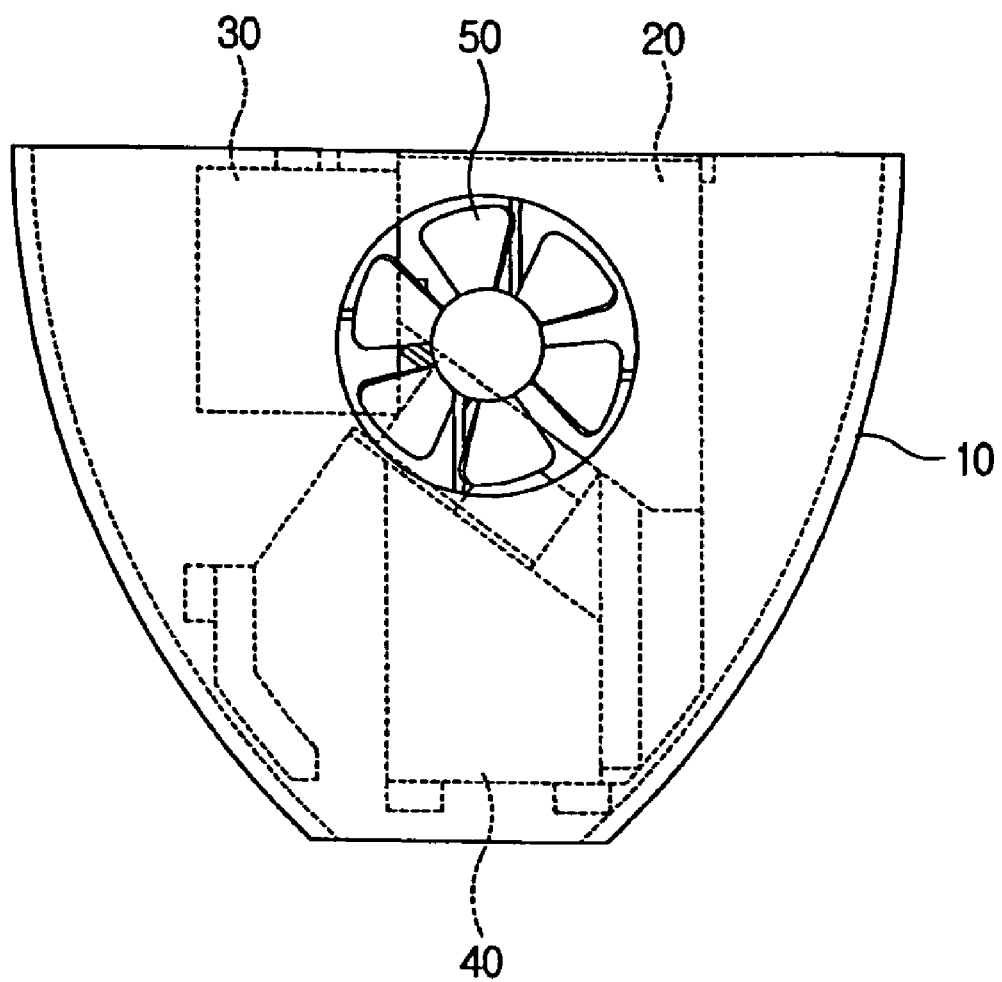
FIG. 6 is a bottom view illustrating a cooling structure of an image projecting apparatus, according to an embodiment of the present general inventive concept.

FIG. 5 is a plan view illustrating a cooling structure of the image projecting apparatus and FIG. 6 is a bottom view illustrating a cooling structure of the image projecting apparatus.

As shown in FIGS. 5 and 6, the cooling fan 50 is on the bottom of the base 10. The lamp unit 20, the ballast unit 30 and the colorwheel unit 40, as examples of heat generating units, are concentratively arranged on the top of the base 10 to correspond to the cooling fan 50. Accordingly, the external air may be respectively introduced simultaneously to the lamp unit 20, the ballast unit 30 and the colorwheel unit 40 by only one cooling fan 50.

Figure 7:
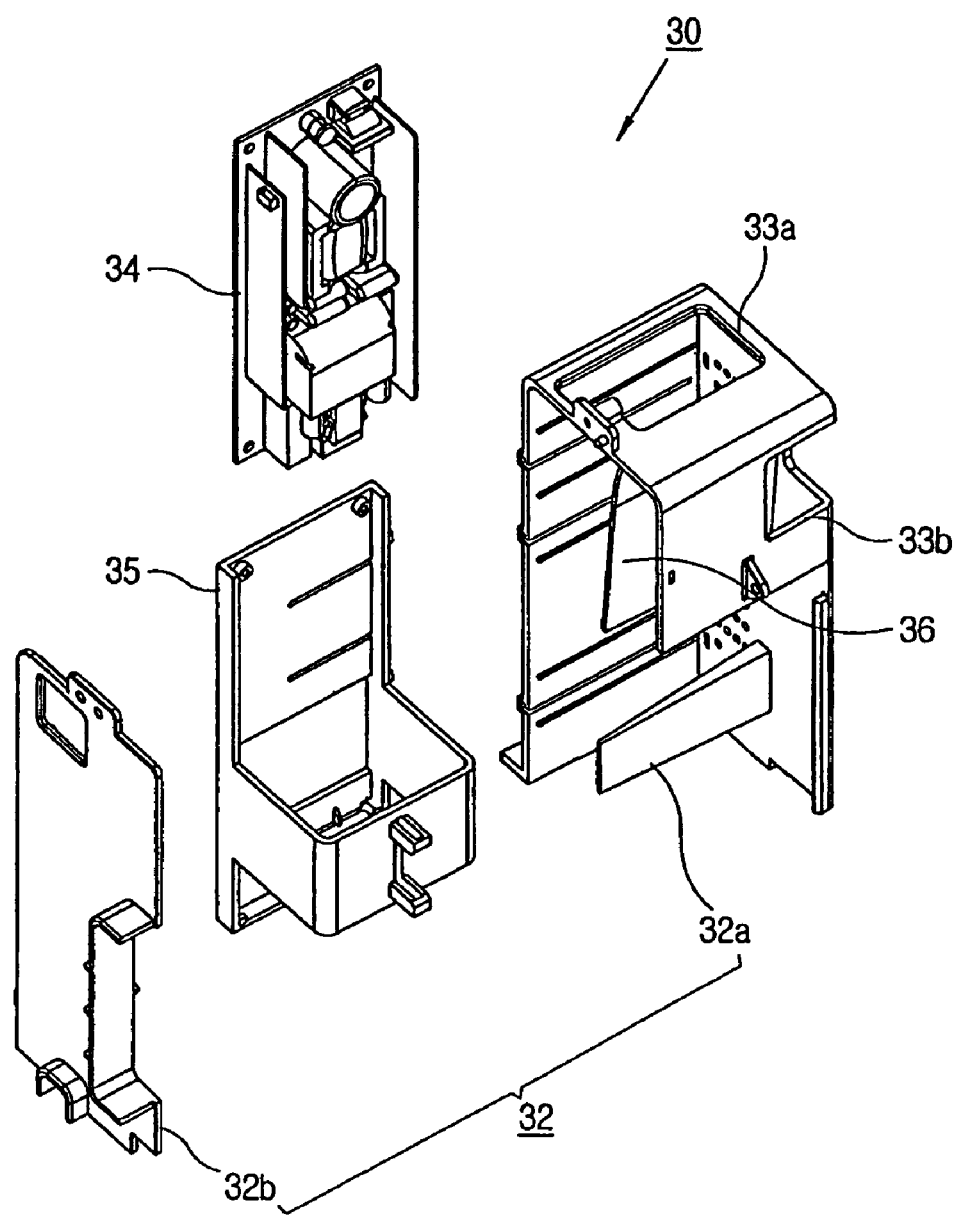
FIG. 7 is a exploded perspective view illustrating a ballast unit of an image projecting apparatus, according to an embodiment of the present general inventive concept.
Figure 8:
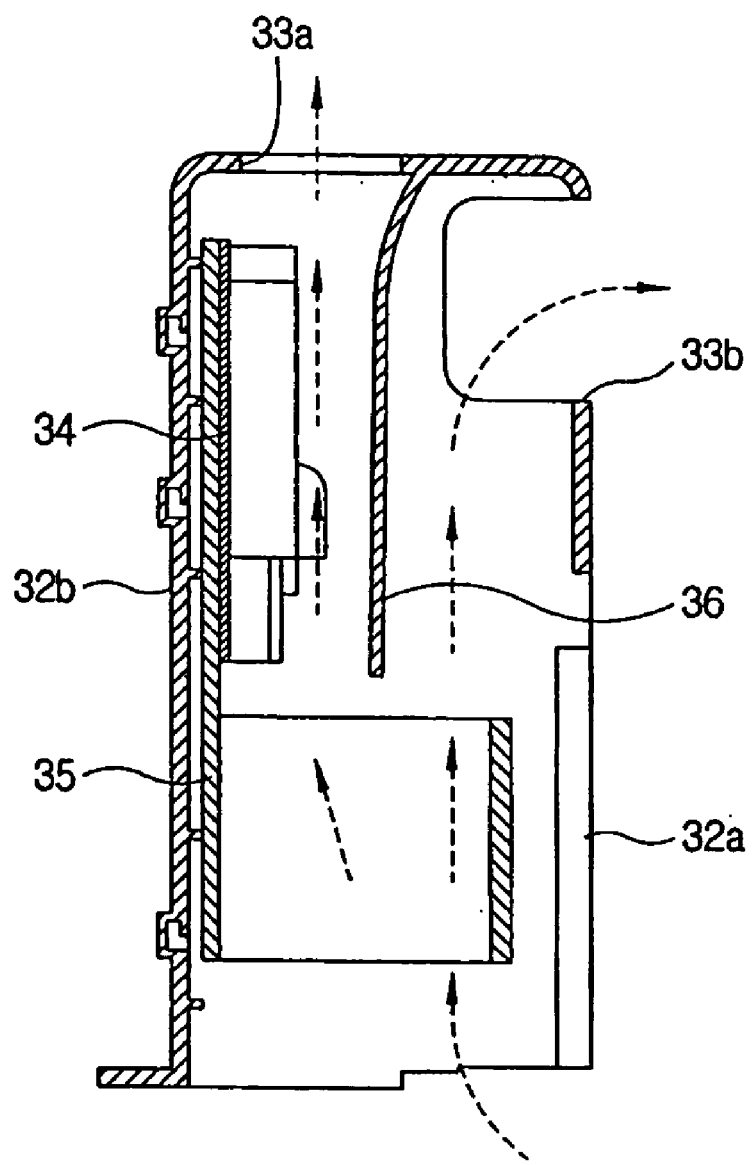
FIG. 8 is a schematic view illustrating flow-paths of external air in a ballast unit of an image projecting apparatus, according to an embodiment of the present general inventive concept.

FIG. 7 is an exploded perspective view illustrating a ballast unit of an image projecting apparatus, and FIG. 8 is a schematic view illustrating flow-paths of external air in the ballast unit of FIG. 7.

As shown in FIGS. 7 and 8, the ballast unit 30 may comprise the ballast housing 32 and the ballast 34 inside of the ballast housing 32. Within the ballast housing 32 there may comprise a main body 32a formed with the exhaust part 33a and the communication part 33b, and a cover 32b detachably combined with the main body 32a.

The ballast 34, disposed under the exhaust part 33a, is firmly supported by a supporting-holder 35. In other words, the ballast 34 is on these flow-paths of the external air of the ballast housing 30 toward the exhaust part 33a.

The ballast housing 32 has at an inside thereof a branch rib 36 branching off these flow-paths of the external air toward the exhaust part 33a and the communication part 33b. Thus, the steamed external air formed by heat generated in the ballast 34 is prevented from being introduced into the guide duct (refer to the reference numeral 80 in FIG. 1) through the communication part.

The structure of the branch rib 36 is variously changeable in the range that these flow-paths of the external air is able to be branched toward the exhaust part 33a and the communication part 33b.

Accordingly, the ballast 34 and the display device (refer to the reference numeral 60 in FIG. 1) is respectively cooled.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image projecting apparatus comprising:
   a base;
   a ballast unit disposed on a top of the base;
   a display device disposed adjacent to the ballast unit;
   a cooling fan disposed on the base and introducing external air to the ballast unit; and
   a guide duct in communication with the ballast unit and guiding the external air blown by the cooling fan to the display device.

2. The image projecting apparatus according to claim 1, wherein the ballast unit comprises:
   a ballast housing in which the external air blown from the cooling fan is introduced therein, and formed with an exhaust part and a communication part in communication with the guide duct;
   a branch rib inside of the ballast housing branching the external air toward the exhaust part and the communication part; and
   a ballast disposed on flow-paths of the external air of the ballast housing toward the exhaust part.

3. The image projecting apparatus according to claim 1, wherein the base comprises a blowhole, the cooling fan is disposed on a bottom of the base to communicate with the blowhole, and the ballast unit is on flow-paths of the external air blown through the blowhole of the base.

4. The image projecting apparatus according to claim 2, wherein the base comprises a blowhole, the cooling fan is disposed on a bottom of the base to communicate with the blowhole, and the ballast unit is on flow-paths of the external air blown through the blowhole of the base.

5. The image projecting apparatus according to claim 3, wherein the ballast unit stands up and a bottom of the ballast unit is opened so that the external air blown by the cooling fan is introduced therein.

6. The image projecting apparatus according to claim 4, wherein the ballast unit stands up and a bottom of the ballast unit is opened so that the external air blown by the cooling fan is directly introduced therein.

7. The image projecting apparatus according to claim 1, wherein the display device comprises a DMD panel.

8. The image projecting apparatus according to claim 2, wherein the guide duct is positioned to correspond to a heat sink on the display device to cool the heat sink.

9. The image projecting apparatus comprising:
   a base formed with a blowhole;
   a cooling fan disposed on a bottom of the base to communicate with the blowhole; and
   a ballast unit standing up to communicate with a top of the base and opened at a bottom thereof to directly introduce therein the external air blown by the cooling fan.

10. The image projecting apparatus of claim 9, wherein the ballast comprises a guide duct to guide the external air blown therein toward heat generating units within the image projecting apparatus to cool the heat generating units.

11. An image projecting apparatus comprising:
    a base;
    a display device disposed adjacent to the ballast unit;
    a ballast unit disposed on a top of the base and having a guide duct to guide air introduced therein to the display device; and
    a cooling unit disposed on the base and introducing external air to the ballast unit.

12. The image projecting apparatus of claim 11, wherein the ballast unit comprises:
    an exhaust part to exhaust a portion of the air introduced therein;

a communication part in communication with the guide duct;

a branch rib inside of the ballast housing branching the external air toward the exhaust part and the communication part; and a ballast disposed on flow-paths of the external air of the ballast unit toward the exhaust part.

13. The image projecting apparatus according to claim 11, wherein the base comprises a hole, the cooling unit is disposed on a bottom of the base to communicate with the hole, and the ballast unit is on flow-paths of the external air blown through the hole of the base.

14. The image projecting apparatus according to claim 12, wherein the base comprises a hole, the cooling unit is disposed on a bottom of the base to communicate with the hole, and the ballast unit is on flow-paths of the external air blown through the hole of the base.

15. The image projecting apparatus according to claim 13, wherein the ballast unit stands up and a bottom of the ballast unit is opened so that the external air blown by the cooling unit is introduced therein.

16. The image projecting apparatus according to claim 14, wherein the ballast unit stands up and a bottom of the ballast unit is opened so that the external air blown by the cooling unit is directly introduced therein.

17. The image projecting apparatus according to claim 11, wherein the guide duct is positioned to correspond with a heat sink on the display device to cool the heat sink.

18. The image projecting apparatus according to claim 11, wherein the cooling unit is a blower type fan.

* * * * *